US005198839A

United States Patent [19]

Takahashi et al.

[11] Patent Number: 5,198,839

[45] Date of Patent: Mar. 30, 1993

[54] ELECTROSTATIC RECORDING APPARATUS FOR SELECTIVELY TRANSFERRING A DEVELOPING AGENT CONVEYED TO THE SURFACE OF A RECORDING ELECTRODE TO AN OPPOSITE ELECTRODE

[75] Inventors: Hideki Takahashi, Fussa; Eiichi Takeuchi; Shigeru Shimizu, both of Iruma; Tadao Yamamoto, Tokyo; Hideaki Inoue, Musashimurayama; Yasuhito Sato, Akishima; Kenji Nakayama, Kodaira; Toshiro Honda, Mitaka; Kenichiro Asako, Kokubunji, all of Japan

[73] Assignee: Casio Computer Co., Ltd., Tokyo, Japan

[21] Appl. No.: 755,142

[22] Filed: Sep. 5, 1991

[30] Foreign Application Priority Data

| | | | |
|---|---|---|---|
| Oct. 12, 1990 | [JP] | Japan | 2-274851 |
| Nov. 27, 1990 | [JP] | Japan | 2-327614 |
| Dec. 27, 1990 | [JP] | Japan | 2-407756 |

[51] Int. Cl.$^5$ .......... G01D 15/06

[52] U.S. Cl. .......... 346/155; 346/153.1; 346/159; 346/160.1

[58] Field of Search .......... 346/154, 155, 153.1, 346/1.1, 159, 160.1

[56] References Cited

U.S. PATENT DOCUMENTS

| | | | |
|---|---|---|---|
| 4,118,710 | 10/1978 | Tomita et al. | 346/153.1 |
| 4,123,762 | 10/1978 | Tomita et al. | 346/155 |
| 4,366,491 | 12/1982 | Ohnishi et al. | 346/155 |
| 4,394,671 | 7/1983 | Erickson | 346/155 |
| 4,544,934 | 10/1985 | Owada et al. | 346/154 |
| 4,831,394 | 5/1989 | Ochiai et al. | 346/160.1 |
| 5,093,676 | 3/1992 | Matsubara et al. | 346/1.1 X |

FOREIGN PATENT DOCUMENTS

| | | |
|---|---|---|
| 59-218872 | 8/1984 | Japan . |
| 63-34553 | 10/1988 | Japan . |

*Primary Examiner*—Benjamin R. Fuller

*Assistant Examiner*—Randy W. Gibson

*Attorney, Agent, or Firm*—Nixon & Vanderhye

[57] ABSTRACT

An electrostatic recording apparatus includes a magnet roll for conveying a developing agent along a predetermined developing agent convey path. A plurality of recording electrodes are arranged to oppose the magnet roll and along the developing agent convey path. An opposite electrode has a portion opposing the plurality of recording electrodes and is arranged with a predetermined gap from the plurality of recording electrodes. A voltage applying unit applies a recording voltage corresponding to supplied dot recording information to each of the plurality of recording electrodes to generate a transferring electric field for transferring the developing agent to the opposite electrode between the opposite electrode and the plurality of recording electrodes, thereby forming a dot recording image corresponding to the dot recording information on the opposite electrode. The voltage applying unit applies, between the plurality of recording electrodes and the opposite electrode, a recovering electric field for recovering a part of the developing agent transferred on the opposite electrode to the plurality of recording electrodes within one-dot recording period in which one dot of the dot recording information is recorded in the conveying direction of the developing agent.

3 Claims, 15 Drawing Sheets

ELECTROSTATIC RECORDING APPARATUS FOR SELECTIVELY TRANSFERRING A DEVELOPING AGENT CONVEYED TO THE SURFACE OF A RECORDING ELECTRODE TO AN OPPOSITE ELECTRODE

BACKGROUND OF THE INVENTION

1. Field of the Invention

The present invention relates to a noncontacting electrostatic recording apparatus for forming an electrostatic recording image without bringing a recording head and a recording medium into contact with each other.

2. Description of the Related Art

A multistylus printer is conventionally well known as an electrostatic recording apparatus. This multistylus printer has a recording head constituted by arranging a large number of needle-like electrodes (styluses) in a main scanning direction with equal small intervals therebetween and selectively applies a voltage to each needle-like electrode in accordance with a recording signal to directly perform discharging on paper, thereby forming an electrostatic latent image. In this printer, in order to easily and stably hold an electric charge on paper, specialty paper coated with a high electrical resistance agent is used. Specialty paper of this type, however, is difficult to write something on it with a pen or a pencil and has a problem in storage stability because it is denatured depending on environmental conditions such as a humidity. Therefore, this specialty paper is not preferred as office paper.

In addition, when a gap between the distal end of each needle-like electrode and the surface of paper is large, a discharge electric field from the needle-like electrodes is widened on the paper surface to increase the size of formed dots, thereby making it difficult to obtain a high-resolution recording image. Therefore, a gap material is provided on the paper surface and brought into slidable contact with the distal ends of the needle-like electrodes to ensure a small gap. However, this system has a problem in that the distal ends of the needle-like electrodes are abraded or wear down.

Therefore, as an electrostatic recording system capable of using plain paper and ensuring a small gap between an image medium and the distal ends of recording electrodes, there is a system for forming a toner image on a drum-like intermediate recording medium and transferring the toner image on paper. According to this system, since the size of an apparatus tends to be increased due to the use of an intermediate recording medium, a process of simultaneously performing recording and development is adopted to avoid the increase in apparatus size. In this case, a large number of recording electrodes extending in a conveying direction (sub scanning direction) of a developing agent convey path are aligned in its widthwise direction (main scanning direction), and a developing agent is selectively transferred from the recording electrodes to the surface of an opposite electrode also serving as an intermediate recording medium in accordance with dot recording information, thereby developing a toner recording image consisting of dots.

In the above system, however, if the length of each recording electrode extending in the sub scanning direction is about one dot, an electric field capable of transferring toner cannot be obtained to fail to increase the image density. Therefore, the recording electrode length must be five to ten times the dot pitch in the sub scanning direction. That is, a development region becomes five to ten times the dot pitch. Therefore, when continuous recording of two or more dots is performed, the toner adhesion amount becomes larger as the dot position becomes later. For example, since the second dot in two-dot continuous recording is formed by repeatedly performing development twice (superposition development), the adhesion amount of toner is about twice that of the first dot. In this manner, since the toner adhesion amount becomes larger as the dot position becomes later, a built-up toner aggregate is broken to enlarge the dot in a trailing end portion of a continuously recorded image, thereby degrading the reproducibility. That is, the contour of the trailing end portion of an image is enlarged to form a low-resolution recording image worse in so-called sharpness.

In addition, in the above system, since the intermediate recording medium is repeatedly used, the intermediate recording medium must be cleaned each time it is used so as not to produce any residual image. However, if a cleaning means is provided around the intermediate recording medium, the size of an electrostatic recording apparatus is increased.

SUMMARY OF THE INVENTION

It is, therefore, an object of the present invention to provide an electrostatic recording apparatus capable of improving the resolution of a recording image and preventing background smudging, thereby improving the printing quality.

In order to achieve the above object, according to the first aspect of the present invention, there is provided an electrostatic recording apparatus comprising:

developing agent conveying means for conveying a developing agent along a predetermined developing agent convey path;

a plurality of recording electrodes opposing the developing agent conveying means and extending along the developing agent convey path;

an opposite electrode having a portion opposing the plurality of recording electrodes and arranged with a predetermined gap from the plurality of recording electrodes, the opposing portion being movable in a conveying direction of the developing agent; and voltage applying means for applying a recording voltage corresponding to supplied dot recording information to each of the plurality of recording electrodes to generate a transferring electric field for transferring the developing agent to the opposite electrode between the opposite electrode and the plurality of recording electrodes, thereby forming a dot recording image corresponding to the dot recording information on the opposite electrode, wherein the voltage applying means applies, between the plurality of recording electrodes and the opposite electrode, a recovering electric field for recovering a part of the developing agent transferred on said opposite electrode to the plurality of recording electrodes within a one-dot recording period in which one dot of the dot recording information is recorded in the conveying direction of the developing agent.

According to the second aspect of the present invention, there is provided an electrostatic recording apparatus comprising:

developing agent conveying means for conveying a developing agent along a developing agent convey path on a developing agent carrier body;

a plurality of recording electrodes opposing the developing agent conveying means and extending along the developing agent convey path, each of the plurality of recording electrodes having a leading end portion;

an opposite electrode having a portion opposing the plurality of recording electrodes and arranged with a predetermined gap from the plurality of recording electrodes, the opposing portion being movable in a conveying direction of the developing agent; and voltage applying means for applying a recording voltage corresponding to supplied dot recording information to each of the plurality of recording electrodes to generate a transferring electric field for transferring the developing agent to the opposite electrode between the opposite electrode and the plurality of recording electrodes, thereby forming a dot recording image corresponding to the dot recording information on the opposite electrode, wherein each of the leading end portions of the plurality of recording electrodes is arranged at a position shifted from a portion where the developing agent carrier body and the opposite electrode are closest to each another to the upstream side of a developing agent convey direction along the developing agent convey path.

According to the third aspect of the present invention, there is provided an electrostatic recording apparatus comprising:

developing agent conveying means for conveying a developing agent along a developing agent convey path on a developing agent carrier body;

a plurality of recording electrodes opposing the developing agent conveying means and extending along the developing agent convey path, each of the plurality of recording electrodes having a leading end portion;

an opposite electrode having a portion opposing the plurality of recording electrodes and arranged with a predetermined gap from the plurality of recording electrodes, the opposing portion being movable in a conveying direction of the developing agent;

voltage applying means for applying a recording voltage corresponding to supplied dot recording information to each of the plurality of recording electrodes to generate a transferring electric field for transferring the developing agent to the opposite electrode between the opposite electrode and the plurality of recording electrodes, thereby forming a dot recording image corresponding to the dot recording information on the opposite electrode;

transferring means for transferring the dot recording image formed on the opposite electrode to paper;

a cleaning electrode arranged at a position on said developing agent carrier body where it is shifted from said leading end portions of said plurality of recording electrodes and located at the upstream side of a developing agent convey direction along said developing agent convey path; and voltage applying means for applying a voltage having a polarity opposite to a charged polarity of the developing agent to the cleaning electrode, thereby electrostatically attracting a nontransferred developing agent on the opposite electrode to the cleaning electrode.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described in detail below with reference to the accompanying drawings.

Figure 1:
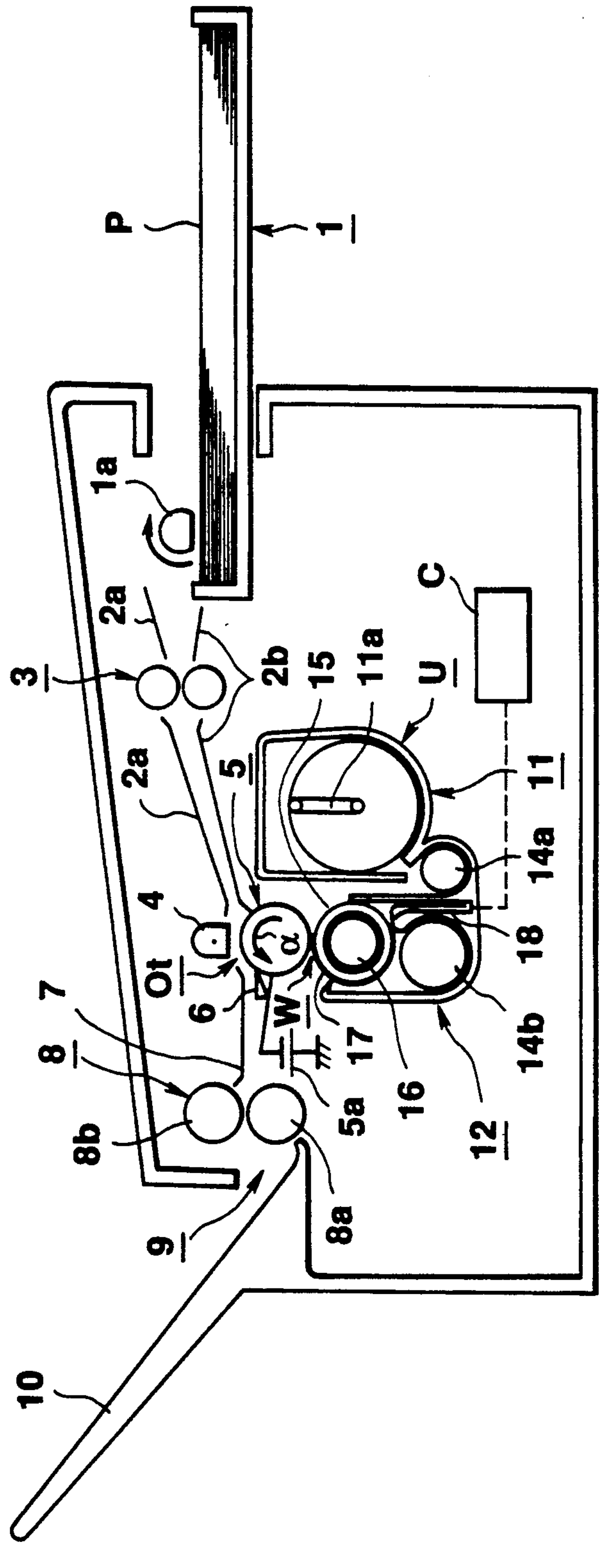
FIG. 1 is a schematic sectional view showing an overall arrangement of an electrostatic recording apparatus according to the first embodiment of the present invention.

FIG. 1 is a schematic sectional view showing the overall arrangement of a recording apparatus as the first embodiment of the present invention. Referring to FIG. 1, reference numeral 1 denotes a paper feed cassette in which sheets of plain paper P are stacked and which is detachably mounted on a side portion of the apparatus. A paper feed roller 1*a* is arranged above the front end portion of the paper feed cassette 1 inserted in the apparatus so as to be rotatable in a direction indicated by an arrow. In front of the paper feed roller 1*a*, upper and lower guide plates 2*a* and 2*b* each consisting of an insulating member are arranged to form a paper convey path. A registration roll pair 3 is arranged in the paper convey path to temporarily stop conveyance of the paper P fed by the paper feed roller 1*a*, thereby adjusting the paper posture. Thereafter, the registration roll pair 3 feeds the paper again to an image transfer section Ot on the downstream side in synchronism with an arrival timing of a recording image (to be described later).

In the image transfer section Ot on the downstream side of the registration roll pair 3, a transfer charger 4 is arranged to oppose a cylindrical electrode 5 as an opposite electrode also serving as an image carrier. The cylindrical electrode 5 is rotated counterclockwise as indicated by an arrow $\alpha$. A recording image forming unit U (to be described later) is arranged to oppose the circumferential surface of the cylindrical electrode 5 on the opposite side of the transfer charger 4. A toner recording image is formed on the surface of the cylindrical electrode 5 by the recording image forming unit U, conveyed to the image transfer section Ot by the rotation of the cylindrical electrode 5, and transferred onto paper fed again. The arrangement of the recording image forming unit U will be described in detail later.

On the downstream side of the image transfer section Ot, a separating claw 6 is arranged such that its distal end is urged against the circumferential surface of the cylindrical electrode. On the downstream side of the separating claw 6, an air-suction type conveyor belt 7 is horizontally arranged to convey paper separated from the surface of the cylindrical electrode 5 to a fixing unit 8 arranged before the conveyor belt 7 while chucking the rear surface of the paper separated from the circumferential surface of the cylindrical electrode 5 by the separating claw 6 after the image transfer. The fixing unit 8 is constituted by a heat roll 8*a* and a pressure roll 8*b* and thermally fixes the toner image while the paper is conveyed between the two rolls. The paper subjected to fixing is exited from an exit port 9 and stacked on a paper exit tray 10 in a face-down state in that the image surface faces down.

In the recording apparatus of this embodiment as described above, since the entire paper convey path from paper feed to paper exhaust is formed substantially straight, a paper conveying operation is generally smooth to prevent easy occurrence of an image defect or a paper conveyance defect such as jamming. In addition, this recording apparatus has another advantage in that a face-down paper exit state not requiring sorting of pages is obtained by the above straight paper convey path.

The arrangement of the recording image forming unit U will be described in detail below.

Figure 2:
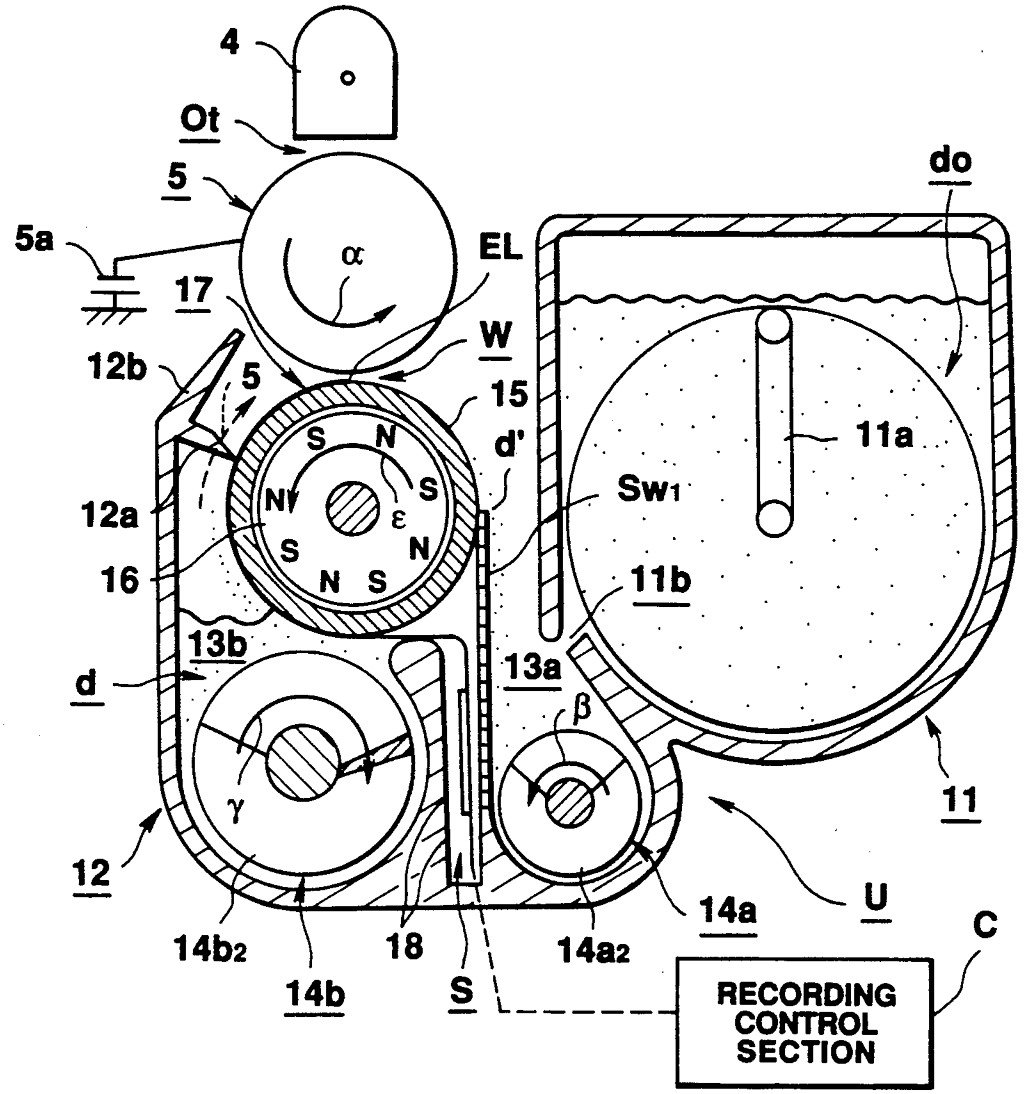
FIG. 2 is a schematic sectional view showing an image forming unit and its peripheral arrangement shown in FIG. 1.

As shown in FIG. 2, the recording image forming unit U generally comprises a development/recording tank 12 having a recording means and a developing agent conveying means, and a developing agent storage tank 11 for storing a developing agent for replenishment. An agitating blade 11*a* is pivotally arranged in the development agent storage tank 11. In this embodiment, a one-component developing agent containing at least an insulating resin, a magnetic fine powder, and coloring agent particles is used as a developing agent, and an insulating magnetic toner having a negative (−) triboelectrification polarity is contained. The developing agent is not limited to the one-component developing agent, but a two-component developing agent obtained by mixing a magnetic carrier and an insulating toner at a predetermined ratio may be used.

Figure 3:
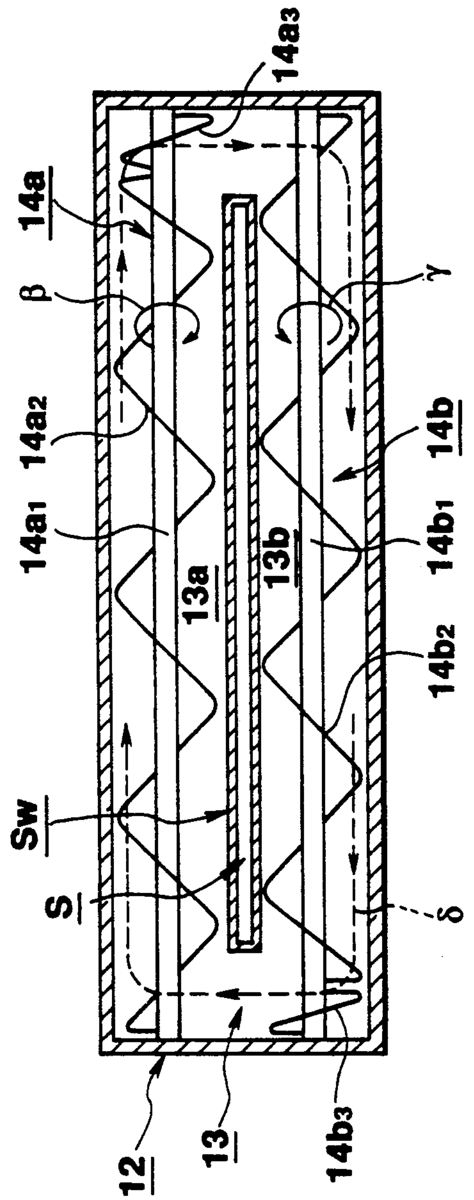
FIG. 3 is a plan sectional view showing a horizontal circulating path for a developing agent in the image forming unit shown in FIG. 1.

A horizontal circulating path 13 for a developing agent shown in FIG. 3 is formed on the bottom portion of the development/recording tank 12. Referring to FIG. 3, a pair of auger rolls 14*a* and 14*b* are rotatably arranged in a pair of parallel longitudinal paths 13*a* and 13*b* of the horizontal circulating path 13. The auger rolls 14*a* and 14*b* are constituting by forming a plurality of spiral blades 14a2 and a plurality of spiral blades 14b2 on the circumferential surfaces of shafts 14a1 and 14b1 and forming reverse feed blades 14a3 and 14b3 having opposite spiral directions each on one end portion of a corresponding shaft (see the perspective view in FIG. 4). The auger rolls 14*a* and 14*b* are arranged in the longitudinal paths 13*a* and 13*b*, respectively, such that the reverse feed blades 14a3 and 14b3 are located on opposite sides. The pair of auger rolls 14*a* and 14*b* are rotated in opposite directions indicated by arrows $\beta$ and $\gamma$ along which a developing agent is conveyed toward the respective reverse feed blades 14a3 and 14b3. As a result, at the corner portions having the reverse feed blades 14a3 and 14b3, reverse conveying forces in opposite directions collide against each other to push the magnetic toner in a perpendicular direction to flow into the other longitudinal path. In this manner, the magnetic toner can be satisfactorily triboelectrified while being circulated under agitation in a direction indicated by a broken arrow $\delta$. A necessary charge amount of a developing agent can be satisfactorily obtained by triboelectrification by changing the shape or material of the auger rolls 14*a* and 14*b*.

A space S surrounded by a wall Sw to prevent ingress of the circulating developing agent is formed in a central portion of the horizontal circulating path 13 having the above arrangement. As shown in FIG. 2, above the auger roll 14*a* closer to the developing agent storage tank 11, a replenishment port 11*b* of replenishing magnetic toner d0 is formed along the axial direction of the auger roll 14*a*.

A development sleeve 15 for vertically conveying the developing agent is horizontally arranged above the other auger roll 14*b*. The developing sleeve 15, which incorporates a rotary magnet roll 16, is arranged to oppose the cylindrical electrode 5 described above. Opposite magnetic poles are alternately formed on the peripheral surface of the magnet roll 16. When the magnet roll 16 is rotated counterclockwise as indicated by an arrow n, the magnetic toner d is conveyed clockwise as indicated by a broken arrow $\zeta$ along the circumferential surface of the developing sleeve 15.

A doctor blade 12*a* for regulating the layer thickness of the magnetic toner d to be a proper value is arranged near the surface of the developing sleeve 15 serving as a developing agent convey path and on the upstream side in the developing agent conveying direction $\zeta$. A toner scattering preventing plate 12*b* is arranged above the doctor blade 12*a*. The toner scattering preventing plate 12*b* prevents inconvenience in that a developing agent conveyed onto the downstream side due to the layer thickness regulation by the doctor blade 12*a* is scattered outside the recording/image forming unit U to contaminate an image. In this embodiment, the upper end portion of the tank wall of the developing/recording tank 12 is branched into two parts, the doctor blade 12*a* is formed in one branch, and the toner scattering preventing plate 12*b* is formed in the other.

A recording section W for forming a toner recording image is arranged as follows on the circumferential surface of the cylindrical electrode 5 on the downstream side of the toner layer thickness regulating section along the toner conveying direction ζ.

Figure 4:
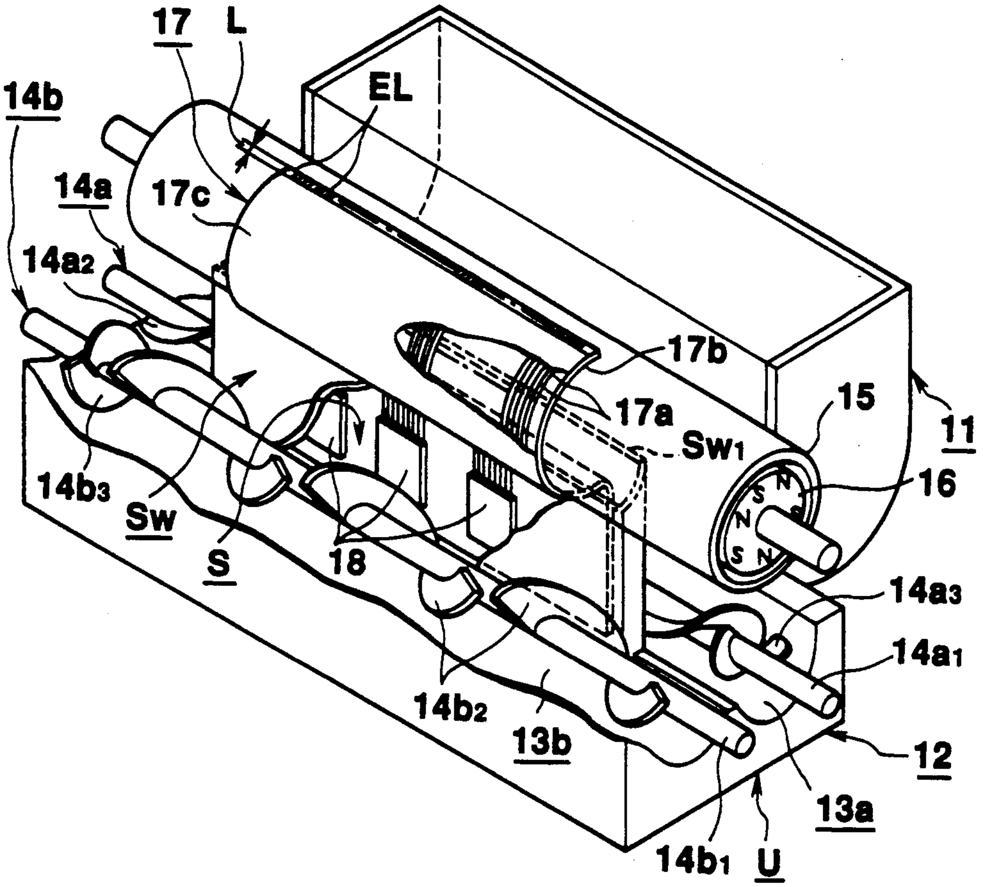
FIG. 4 is a perspective view showing the entire image forming unit shown in FIG. 1.

A recording electrode sheet 17 having a large number of recording electrodes is bonded on the circumferential surface of the development sleeve 15 in a region on the upstream side along the toner conveying direction from the position closest to the surface of the cylindrical electrode 5 (in this embodiment, a region on the circumferential surface of the left half shown in FIG. 4). As shown in FIG. 4, in the recording electrode sheet 17, a large number of parallel recording electrode lines 17*a* are arranged in the longitudinal direction of the sheet along the circumferential direction of the surface of the development sleeve 15 with a predetermined small pitch in the widthwise direction of the sheet (the widthwise direction of the toner convey path: the main scanning direction). The number of recording electrode lines 17*a* is set to correspond to the maximum data number of one main scanning line. In the recording electrode sheet 17 of this embodiment constituted by a flexible printed circuit board (FPC), the recording electrode lines 17*a* consisting of a large number of nonmagnetic conductive materials are patterned at a density of 84.6 μm pitch (300 DPI) with intervals of 40 μm therebetween on a base film 17*b* consisting of a flexible insulating material. An insulating coat 17*c* is coated on the surface of the recording electrode sheet 17 except for a small region Z at the end of the sheet. The insulating coat 17*c* ensures insulation between the recording electrode lines 17*a* and prevents wear of the recording electrode lines 17*a* caused by friction with the magnetic toner.

Figure 5:
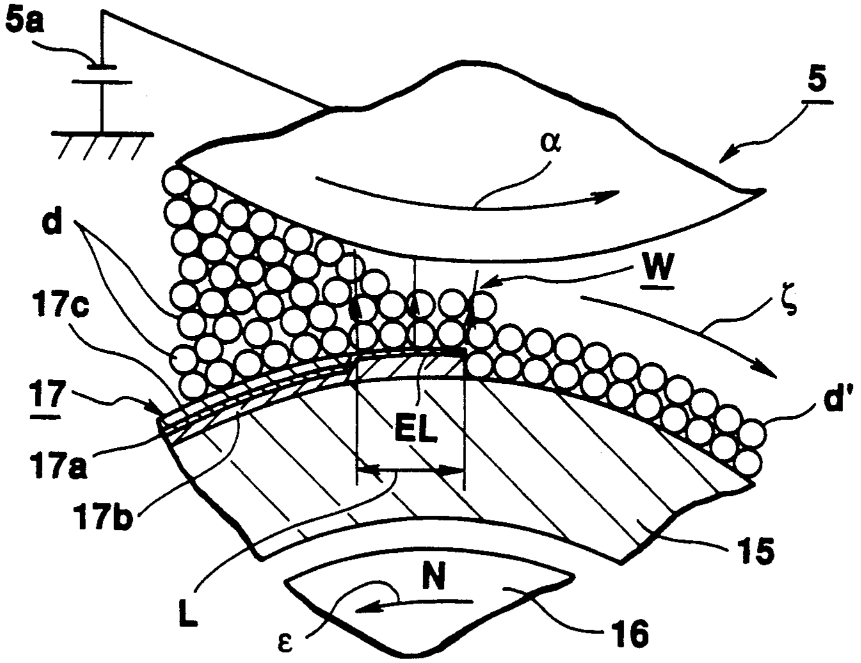
FIG. 5 is an enlarged sectional view showing the first recording state at a certain timing in a recording section of the image forming unit shown in FIG. 1.

FIG. 5 is a schematic sectional view showing the recording section W in an enlarged scale. As shown in FIG. 5, when the end portions of the recording electrode lines 17*a* are not covered with the insulating coat 17*c* but exposed, a necessary recording electric field can be efficiently formed between these end portions and the circumferential surface of the opposing cylindrical electrode 5. The exposed end portions of the recording electrode lines 17*a* serve as recording electrodes EL which actually perform a recording operation. If a length L of the recording electrodes EL along the toner conveying direction (sub scanning direction) is too small, the strength of a recording electric field is decreased to decrease the image density. Therefore, the length L must be larger than the dot pitch (in this embodiment, 84.6 μm as described above). If the length L of the recording electrodes EL is excessively large, the area influenced by the strength of an electric field is widened to decrease the sharpness of an image.

Referring to FIG. 2, on the downstream side of the recording section W along the toner conveying direction ζ, a wall Sw1 on the developing agent storage tank 11 side is extended by the wall surrounding the central space S of the above-mentioned horizontal circulating path 13 so that the distal end of the wall Sw1 abuts against the circumferential surface of the development sleeve 15. As a result, a magnetic toner d', which is not transferred in the recording section W but remains on the surface of the development sleeve 15 and is conveyed upon rotation of the magnet roll 16, is scraped on a replenishment tank-side path 13*a* of the horizontal circulating path 13. That is, the magnetic toner d' is prevented from entering the central space S or being returned not via the horizontal circulating path 13 but directly to the upstream side along the circumferential surface of the development sleeve 15. Note that an exclusive plate member for scraping the residual magnetic toner d' deposited on the development sleeve 15 may be prepared independently of the wall of the central space S. In this case, the scraping member is vertically supported such that its distal end abuts against the circumferential surface of the development sleeve 15 and its proximal end extends to the bottom portion of the central space S. When the scraping member is formed of a magnetic material, a smoother scraping/returning effect can be obtained because the magnetic force of the magnet roll 16 can be interrupted.

As described above, the recording electrode sheet 17 arranged on about a half of the circumferential surface of the development sleeve 15 is extended horizontally and then vertically downward into the central space S of the horizontal circulating path described above. A plurality of driving circuit elements 18 for applying a recording voltage on the respective recording electrodes EL in correspondence with recording data are mounted on the vertically extending portion of the recording electrode sheet 17. As shown in FIG. 4, N recording electrode lines 17*a* of the recording electrode sheet 17 are connected to each driving circuit element 18. In this manner, since the end portion of the recording electrode sheet 17 mounting the driving circuit elements 18 is housed in the central space S, the driving circuit elements 18 can be protected from dust such as a developing agent, and the structure of the developing/recording tank 12 can be made significantly compact.

Figure 6:
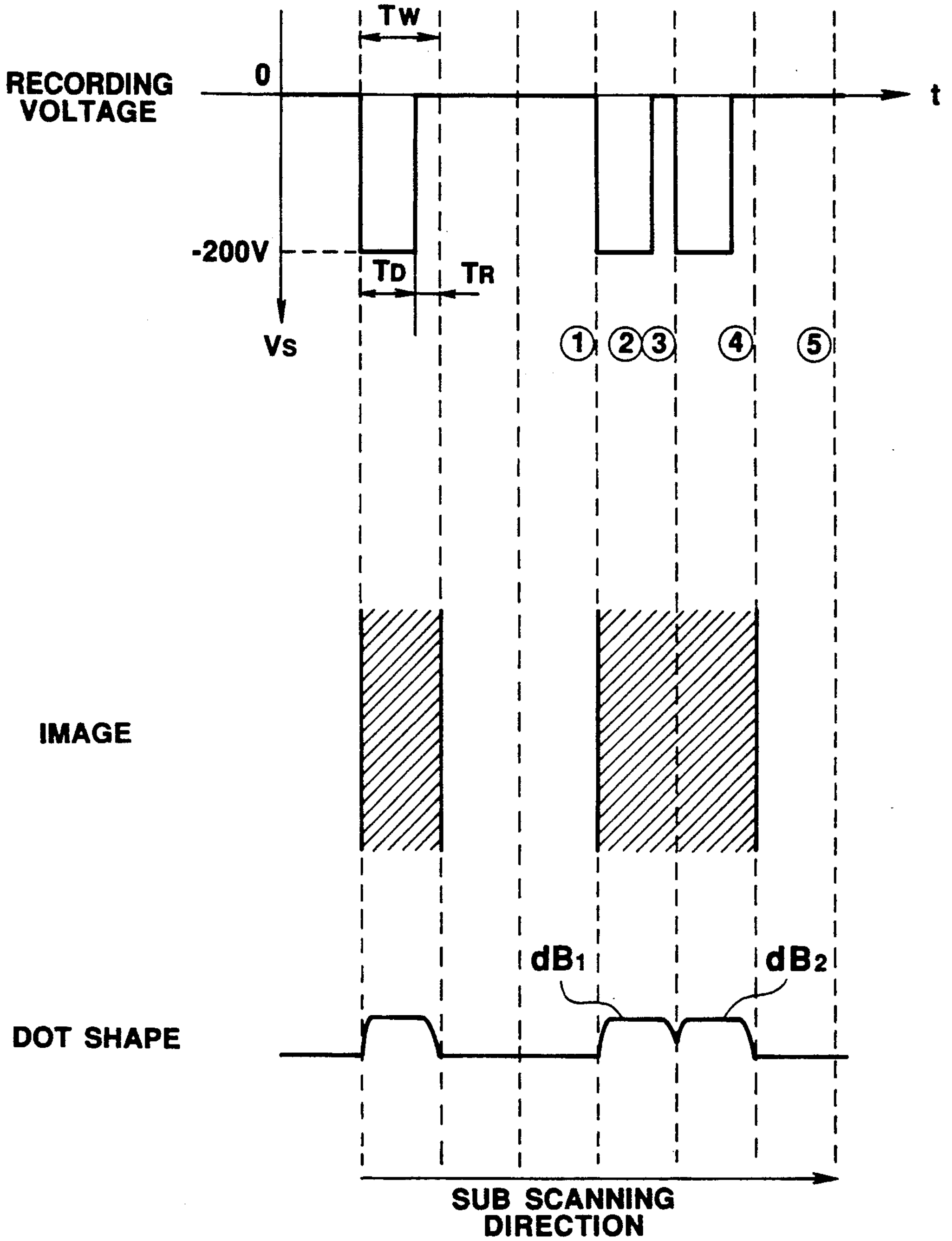
FIG. 6 is a view for explaining a relationship between a recording voltage to be applied to the recording section, a formed image, and a dot shape.

Referring to FIG. 2, each driving circuit element 18 is connected to the recording control section C through a signal line (indicated by a broken line) so as to exchange electrical signals therebetween. The driving circuit element 18 outputs a recording voltage Vs as shown in FIG. 6 to the respective recording electrodes in accordance with dot recording information in the form of a bit or a recording voltage control signal supplied from the recording control section C. The recording voltage Vs is a binary signal voltage which changes between −200 V (ON voltage) and 0 V (OFF voltage). If one-bit recording information supplied from the recording control section C is "H", the driving circuit element 8 applies the ON voltage of −200 V to the corresponding recording electrode EL. As a result, since a bias power source 5*a* is connected to the cylindrical electrode opposing the recording electrode and applies a bias voltage of −30 V to the cylindrical electrode, a toner transferring electric field based on a voltage difference of 170 V is formed from the cylindrical electrode 5 to the recording electrodes EL. Since the magnetic toner d charged to have a negative polarity moves to a portion where the potential is high, only the magnetic toner d on the recording electrode EL applied with the voltage of −200 V is selectively transferred to the surface of the cylindrical electrode 5 to form one black dot. If the one-bit input recording information is "L", the OFF voltage of 0 V is applied to the recording electrodes EL. As a result, the potential difference between the cylindrical electrode 5 and the recording electrodes EL becomes −30 V from the cylindrical electrode 5 side, and a toner recovering electric field is formed in the recording section W in a direction opposite to that of the above toner transferring electric field.

In the first embodiment, as is apparent from FIG. 6 for explaining a relationship between a recording voltage, an image, and a dot shape, in order to form one black dot, the ON voltage is not applied over the entire recording period $T_W$ of one dot but the OFF voltage is forcedly applied during a predetermined time $T_R$ at the end of the one-dot recording period $T_W$ to serve as the developing agent recovering electric field. This forced OFF voltage application time $T_R$ is periodically assured for every one-dot recording period $T_W$ as shown in FIG. 6 not only in recording of only one black dot but also in continuous recording of tow or more black dots. In this case, the length of the forced OFF voltage application time $T_R$ must be set to be equal to or longer than a time (transfer limit) required to actually, reversely transfer, i.e., recover toner particles from the cylindrical electrode 5 to the surfaces of the recording electrodes EL. Since it is experimentally confirmed that the shortest toner transfer effective time is about 10 μsec, the forced OFF voltage application time $T_R$ must be set to be 10 μsec or more. If the one-dot recording period $T_W$ is a long period, exceeding 1 msec, the ratio of the forced OFF voltage application time $T_R$ with respect to the one-dot recording period $T_W$ must be set to be 1% or more in order to ensure the toner recovering effect.

Assuming that a recording image formation speed (process speed) is 42.3 [mm/sec], the one-dot recording period $T_W$ of this embodiment is given by:

$$T_W = 0.0846/42.3 = 2.0 \text{ [msec]}$$

because the dot diameter corresponding to a dot density of 300 DPI is 0.0846 mm. In this embodiment, therefore, the forced OFF voltage application time $T_R$ is preferably set to be 0.02 msec (as 1% of 2.0 msec) or more. Note that the process speed is the convenance speed of paper conveyed to the transfer position Ot in FIG. 1 and is set to coincide with the moving speed of the circum ferential surface of the cylindrical electrode 5.

In order to ensure the forced OFF voltage application time $T_R$ described above, a recording control section C outputs a recording voltage control signal to the driving circuit elements 18. In this embodiment, AND gates are provided in one-to-one correspondence with the recording electrodes in the driving circuit elements 18. The recording voltage control signal and the dot recording information described above are supplied to this AND gate, and the recording voltage is switched between the ON and OFF voltages and output to each recording electrode EL on the basis of a logical AND signal output from the AND gate. In this case, even if the dot recording information supplied to the AND gate is "H", the logical AND is switched from "H" to "L" when the recording voltage control signal is switched from "H" to "L". As a result, when the recording voltage control signal is switched from "H" to "L" during the one-dot recording period $T_W$, the recording voltage is switched from the ON voltage to the forced OFF voltage. If the dot recording information is "L", the output signal from the AND gate remains "L" over the entire one-dot recording period $T_W$ even when the recording voltage control signal is switched from "H" to "L". Therefore, the recording voltage remains to be the OFF voltage.

As described above, by ensuring the necessary length of the forced OFF voltage application time $T_R$ at the end of each one-black-dot recording period $T_W$, a black dot on which toner uniformly adheres and which has an accurate size can be formed, and a dot recording image having excellent dot reproducibility can be stably obtained. A recording image forming operation will be described below.

In FIG. 2, when the magnet roll 16 is rotated in the direction indicated by the arrow ε, a rotational magnetic field for rotating particles of the magnetic toner d is formed on the circumferential surface of the development sleeve 15, and the magnetic toner d is conveyed in the direction indicated by the arrow ζ opposite to the rotating direction of the magnet roll 16 while a brush of the toner is formed. The conveyed magnetic toner d is regulated to have a predetermined thickness by the doctor blade 12a and conveyed to the recording section W. In this embodiment, the magnetic toner d is triboelectrified to have a negative polarity by friction between the toner particles or the toner and the circumferential surface of the development sleeve 15. In the recording section W, the recording voltage Vs having the forced OFF voltage application time $T_R$ as shown in FIG. 6 is applied to the respective recording electrodes EL, and a toner recording image having good dot reproducibility is formed as will be described below.

FIG. 5 is a schematic sectional view showing the state of the recording section W at a timing ① in FIG. 6. At the timing ② which is immediately before execution of two-black-dot continuous recording, the driving circuit elements apply the OFF voltage (0 V) to the recording electrodes EL, and the bias power source 5a applies the bias voltage of −30 V to the cylindrical electrode 5, thereby forming a toner recovering electric field in the direction indicated by the arrow in the recording section W. The magnetic toner d charged to have a negative (−) polarity and conveyed to the recording section W moves in a direction opposite to the direction of the electric field. Therefore, the toner d is not transferred to the circumferential surface of the cylindrical electrode 5 but held on the recording electrodes EL by the toner recovering electric field.

Figure 7:
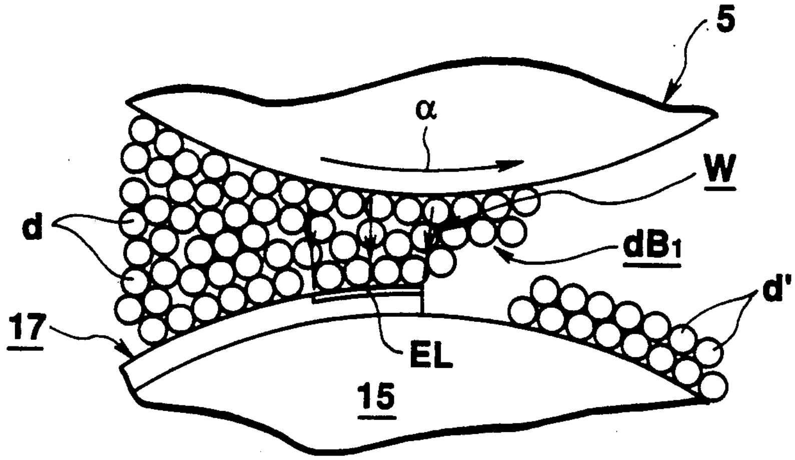
FIG. 7 is a schematic sectional view showing the second recording state in the recording section at another timing.

Referring to FIG. 6, the recording voltage Vs is switched to the ON voltage (−200 V) to start recording of one black dot, and the ON voltage is applied over a time $T_D$ to form a toner transferring electric field. FIG. 7 shows the state of the recording section W at a timing ② which is immediately before switching from ON voltage application to OFF voltage application. Since the ON voltage is kept applied to the recording electrodes EL by the driving circuit elements and the bias voltage of −30 V is kept applied to the cylindrical electrode 5, the toner transferring electric field in the direction indicated by the arrow is formed in the recording section W. Therefore, the magnetic toner d moves to the cylindrical electrode 5 and adheres on the circumferential surface of the electrode. The toner d is conveyed outside the recording section W as the cylindrical electrode 5 rotates in the direction indicated by the arrow α, thereby forming a first black dot dB1.

Figure 8:
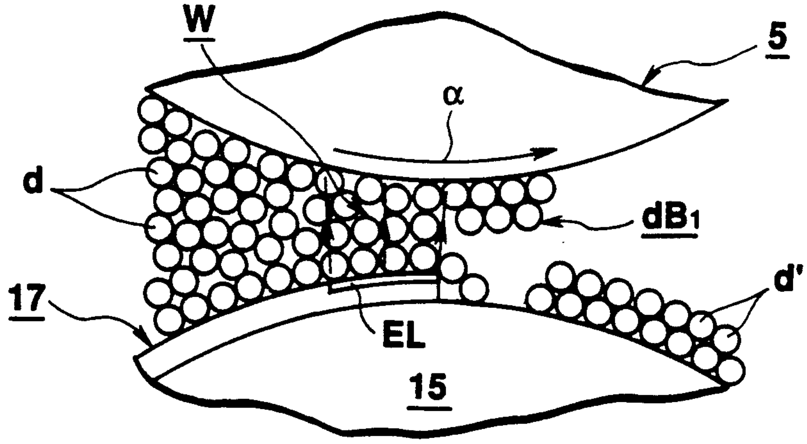
FIG. 8 is a schematic sectional view showing the third recording state in the recording section at still another timing.

At a timing ③ at which the recording voltage Vs is switched to the forced OFF voltage as shown in FIG. 6, the electric field in the recording section W is switched to the toner recovering electric field, and the magnetic toner d transferred to the circumferential surface of the cylindrical electrode 5 of the recording section W at the timing ② is recovered to the recording electrodes EL, as shown in FIG. 8. In this manner, since the toner transferring electric field is switched to the toner recovering electric field before the one-dot recording period is finished, a super-position phenomenon caused by superposition of the toner is suppressed, and a first black dot dB1 in which the magnetic toner d uniformly adheres on the entire dot region and which has an accurate predetermined size is formed.

Figure 9:
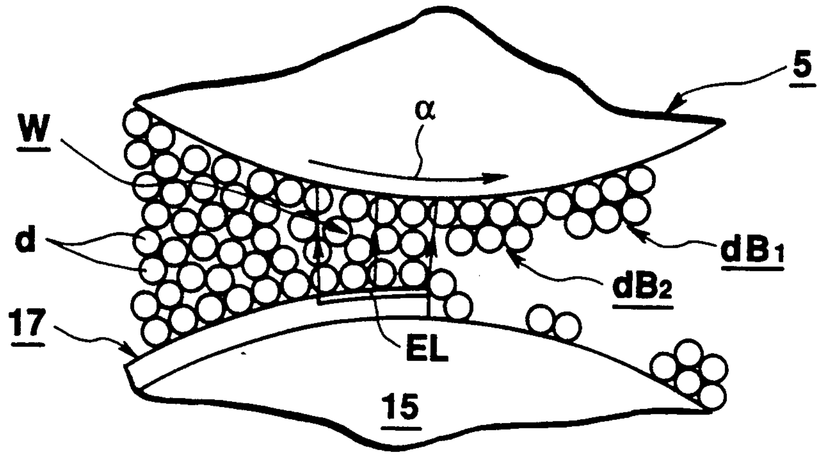
FIG. 9 is a schematic sectional view showing the fourth recording state in the recording section at still another timing.

Referring to FIG. 6, a timing ④ is a timing at which the one-dot recording period $T_W$ has elapsed from the timing ③ and at which the recording voltage is switched from the ON voltage to the forced OFF voltage in order to accurately form the second dot in the continuous dot recording. Also at this timing ④, as shown in FIG. 9, a toner recovering electric field similar to that formed at the timing ③ is formed in the recording section W, and a second black dot dB2 is being accurately formed with a uniform toner adhesion amount on the circumferential surface of the cylindrical electrode 5 subsequently to the first black dot dB1.

The states of the recording section W at the above timings ③ and ④ will be compared with those in a conventional scheme in which no forced OFF voltage application time is provided.

Figure 16:
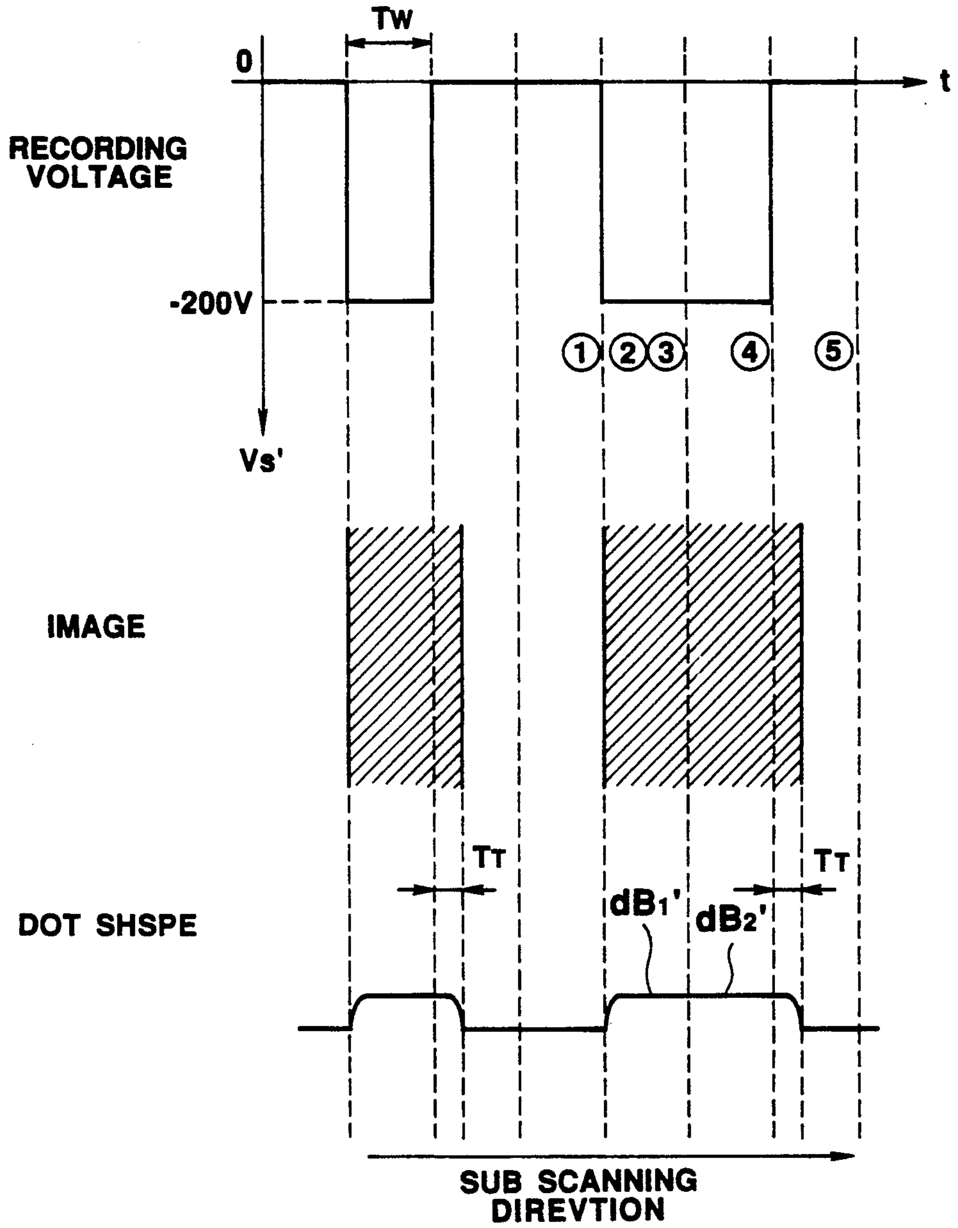
FIGS. 16 to 19 are views for explaining drawbacks of a conventional image forming apparatus.
Figure 17:
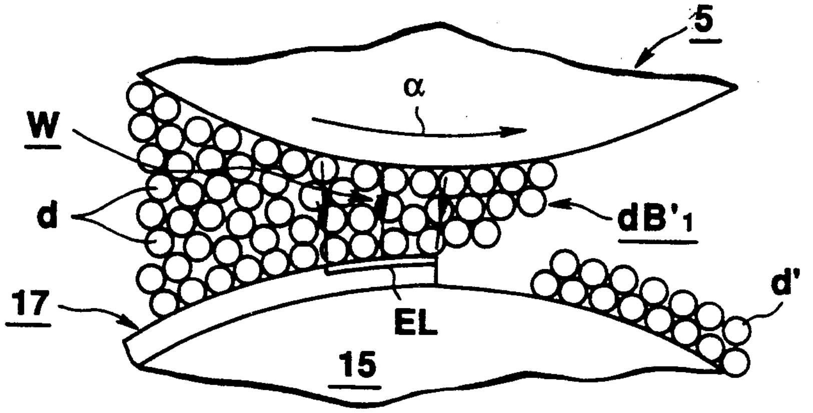
Figure 18:
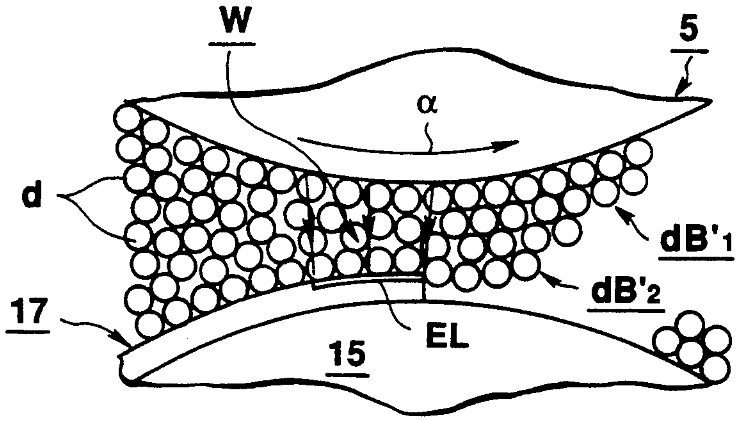

At a timing ③ in FIG. 16 showing a conventional recording voltage Vs', since the ON voltage is kept applied to the recording electrodes, the toner transferring electric field is kept formed in the recording section W as shown in FIG. 17. Therefore, on a first black dot dB1' of continuous dot recording, which is being formed on the circumferential surface of the cylindrical electrode 5, the adhesion amount of toner is increased as the position moves to the trailing end of the dot. In addition the ON voltage is kept applied to the recording electrodes EL until a timing ④ after the one-dot recording period $T_W$ shown in FIG. 16. Therefore, as is apparent from FIG. 18 showing the state obtained at the timing ④, the adhesion amount of toner is gradually increased as the position moves to the trailing end of the dot by the superposition phenomenon effect, and especially the adhesion amount on the second black dot dB2' is increased as compared with the state shown in FIG. 9. A large amount of the toner deposited on the trailing end portion of the second black dot dB2' tends to be broken to enlarge the dot. That is, although $T_T$ shown in FIG. 16 denotes a period during which no toner is preferably deposited, excessive toner adheres for the above reason even after the period $T_W$ has elapsed.

Figure 19:
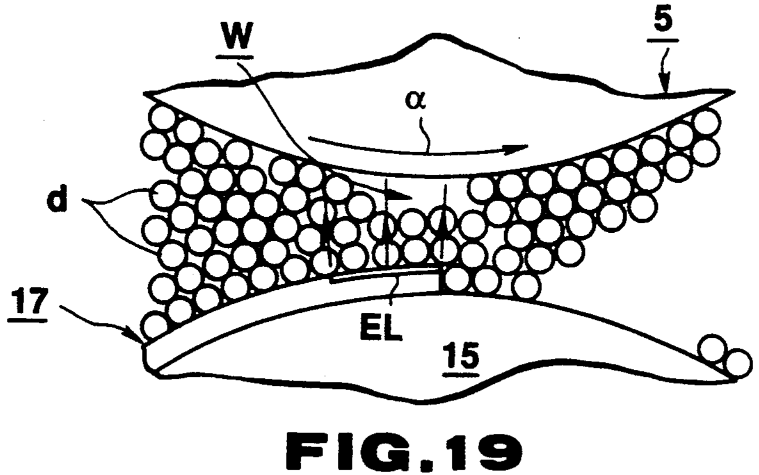

FIG. 19 shows the state of the recording section W at a timing ⑤ at which the two-dot continuous recording is completely finished by applying the OFF voltage over the one-dot recording period $T_W$ from the timing ④ shown in FIG. 16. As is apparent from FIG. 19, even when the recording voltage Vs is switched to the OFF voltage to start recovery of the toner immediately after a two-dot continuous recording time period ($2\times T_W$) has elapsed, a large amount of toner deposited on the trailing end portion of a dot is broken to enlarge the dot, thereby forming an inaccurate toner recording image of two-dot continuous recording on the circumferential surface of the cylindrical electrode 5.

Figure 10:
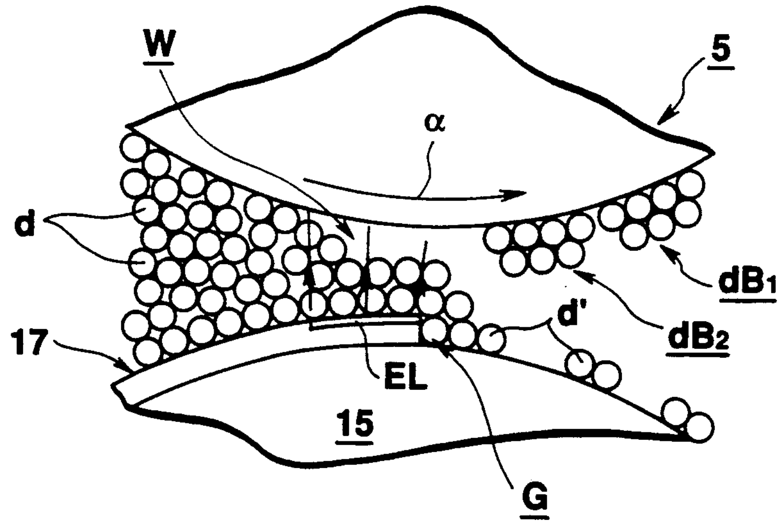
FIG. 10 is a schematic sectional view showing the fifth recording state in the recording section at still another timing.

On the contrary, at the timing ⑤ in FIG. 6 showing the recording voltage Vs of this embodiment, a continuous dot recording image consisting of the first and second black dots dB1 and dB2, in which the toner uniformly adheres and which have accurate sizes, and excellent in dot reproducibility and trailing end sharpness is clearly formed on the circumferential surface of the cylindrical electrode 5, as shown in FIG. 10.

As described above, the dot recording image corresponding to input recording information is formed on the circumferential surface of the cylindrical electrode 5 with good dot reproducibility. This dot recording image is conveyed from the recording section W to the image transfer section by the rotation of the cylindrical electrode 5. In this case, since a step G corresponding to the thickness of the recording electrode sheet 17 is formed on the immediately downstream side of the recording section W as shown in FIG. 10, the magnetic toner d' not subjected to image formation but remaining on the development sleeve 15 moves away from the surface of the cylindrical electrode 5 immediately after passing through the recording section W. Therefore, an inconvenience in that the toner recording image formed on the circumferential surface of the cylindrical electrode 5 in the recording section W is disturbed by mutual interference with the residual magnetic toner d' can be reliably avoided.

Referring to FIG. 1, the toner recording image formed on the surface of the cylindrical electrode 5 is conveyed to the image transfer section Ot by the rotation of the cylindrical electrode 5 in the counterclockwise direction $\alpha$ and transferred onto paper fed again by the registration roll pair 3 in synchronism with it. To adjust the density of the toner recording image, the bias voltage of the bias power source 5a need only be changed. In this case, a proper adjustment range is about 0 to $-50$ V, and the image density is increased as the value becomes closer to 0 V.

Referring to FIG. 2, the magnetic toner d' not transferred to the cylindrical electrode 5 but remaining in the recording section W moves to the downstream side of by the rotation of the magnet roll 16 and is scraped from the surface of the development sleeve 15 by the scraping wall Sw1. The scraped toner falls into the auger roll 14a and is mixed under agitation with magnetic toner d0 replenished from the replenishment port 11b.

The fell and returned residual magnetic toner d' is circulated by the rotation of the auger roll 14a while being mixed with the replenishing magnetic toner d0. Referring to FIG. 3, the magnetic toner circulated in the direction indicated by the broken arrow k is vertically conveyed again by the rotational magnetic field of the magnet roll 16 extending above the longitudinal path 13b on the nonreplenishment side while being conveyed in the path 13b.

In this manner, the residual magnetic toner d' not transferred to the cylindrical electrode 5 but conveyed to the downstream side in the recording section W is scraped on the horizontal circulating path 13, smoothly returned to the upstream side under agitation through the horizontal circulating path 13, and subjected to formation of a toner recording image again. In this case, since the magnetic toner d before the vertical conveyance is conveyed under agitation along the axial direction (the widthwise direction of the toner convey path: the main scanning direction) of the development sleeve 15, the toner is constantly, uniformly supplied on the circumferential surface of the development sleeve 15 throughout in its widthwise direction. Therefore, since the magnetic toner d is constantly, uniformly carried by the surface of the development sleeve 15 throughout in its widthwise direction and conveyed to the recording section W, a high-quality recording image having a uniform image density can be stably obtained as described above. In addition, the magnetic toner is satisfactorily triboelectrified due to the friction between the magnetic toner particles caused when the magnetic toner d is circulated in the horizontal circulating path 13 under agitation.

Although the forced OFF voltage application time $T_R$ is set once at the end of the one-dot recording period $T_W$, it may be set in the first half or the central portion of the one-dot recording period $T_W$ or may be set a plurality of times within the one-dot recording period $T_W$.

The second embodiment of the present invention obtained by further improving the first embodiment will be described below with reference to FIGS. 11A and 11B, 12, and 13A to 13D.

Figure 11A:
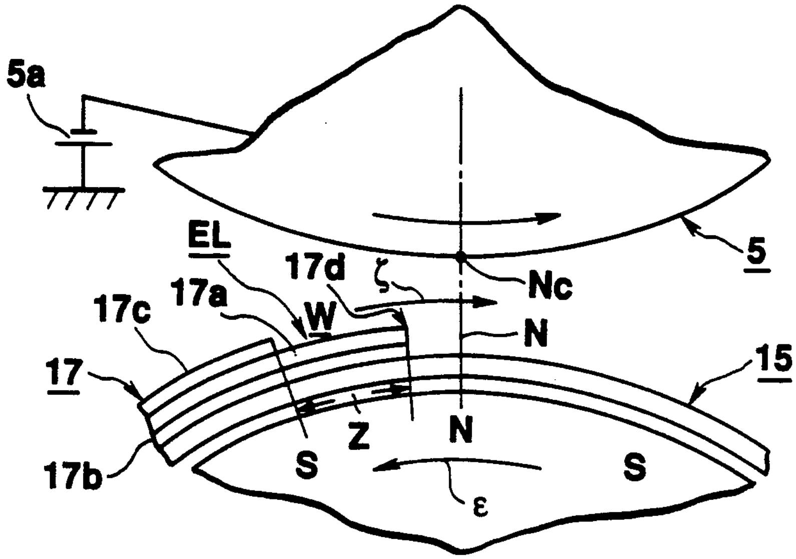
FIGS. 11A and 11B are views showing the arrangements of recording sections according to the first and second embodiments of the present invention, respectively.
Figure 11B:
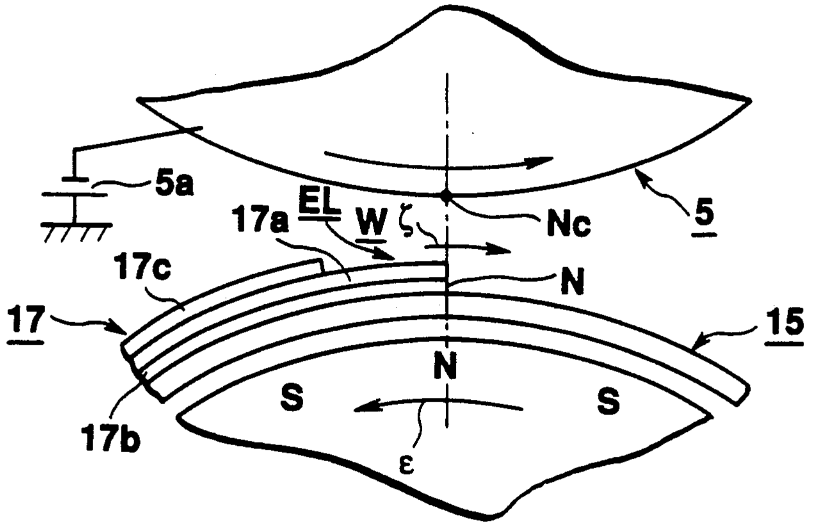

FIGS. 11A and 11B are sectional views each showing a part of FIG. 2 in an enlarged scale.

As described above, a recording electrode sheet 17 is arranged such that its longitudinal direction corresponds to the circumferential direction of the surface of a development sleeve 15. In the second embodiment, a leading end 17*d* of the recording electrode sheet 17 (recording electrode 17*a*) is slightly shifted from a position N where the circumferential surfaces of a cylindrical electrode 5 and the development sleeve 15 are closest to each other to the upstream side along a toner conveying direction $\zeta$. The shift amount of the leading end 17*d* is preferably about 1 mm assuming that the outer diameter of the cylindrical electrode 5 is 20 mm, the outer diameter of the development sleeve 15 is 23 mm, and the thickness of the recording electrode line 17*a* is 23 μm. By setting the leading end 17*d* of the recording electrode line 17*a* as described above, a high-resolution recording image consisting of sharp dots excellent in so-called sharpness can be formed for the following reason.

Figure 12:
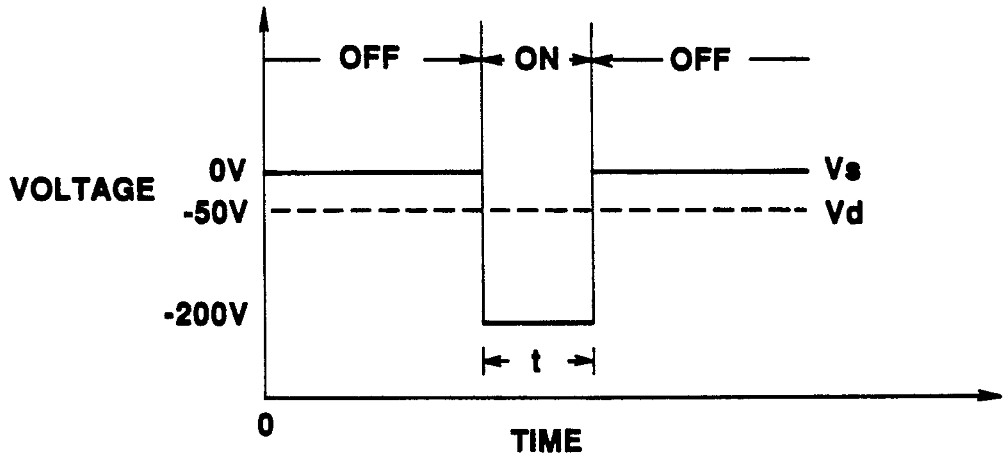
FIG. 12 is a timing chart showing a voltage applying operation to the recording section of the image forming unit shown in FIG. 1.
Figure 13A:
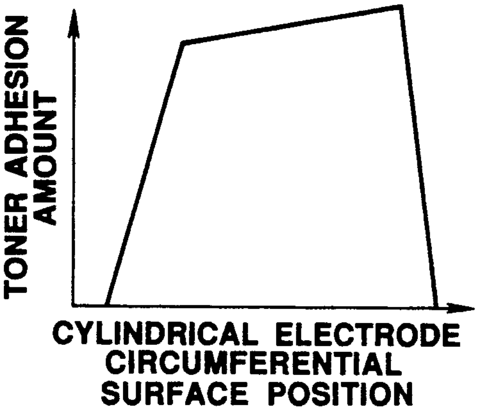
FIGS. 13A to 13D are graphs showing the advantage of a dot forming operation of the second embodiment over the first embodiment.

That is, when the distal end of the recording electrode EL is located at the closest distance position N as shown in FIG. 11B, a toner image having a pattern as shown in FIG. 13A is formed on the circumferential surface of the cylindrical electrode 5 upon application of an ON voltage. Subsequently, as shown in FIG. 12, the voltage is switched to an OFF voltage after the ON voltage is applied for a time t (one-dot write period). The electric field is also switched from a transferring electric field to a recovering electric field in correspondence with the switching between the voltages, and toner on a trailing end portion of the toner image along the conveying direction of the cylindrical electrode is recovered to the recording electrode as indicated by a broken line in FIG. 13B. In this case, as shown in FIG. 11B, a portion Nc of the circumferential surface of the cylindrical electrode 5 which is closest to the development sleeve 15 is located immediately above the leading end of the recording electrode EL. Therefore, the deposited toner immediately moves away from the leading end of the recording electrode EL by the rotation of the cylindrical electrode 5, and the recovering electric field does not sufficiently act on all of the separating toner particles. As a result, since toner in the trailing end portion of the formed toner image is not sufficiently recovered, a black dot poor in so-called sharpness is formed.

Figure 13B:
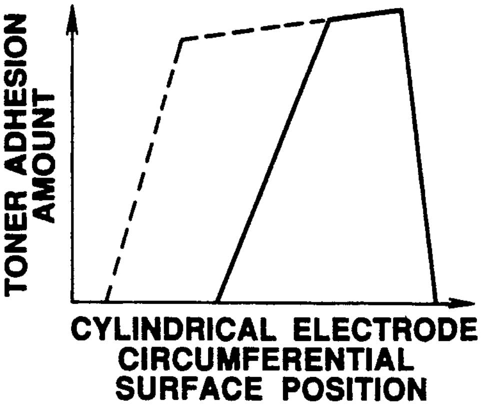
Figure 13C:
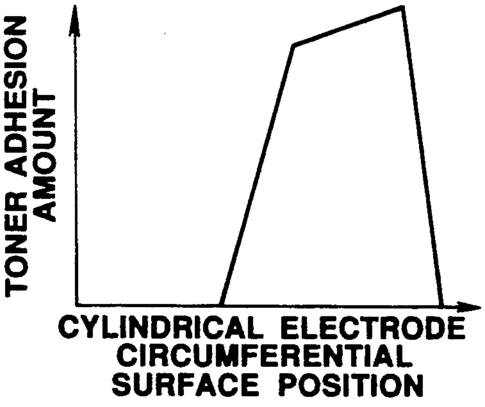
Figure 13D:
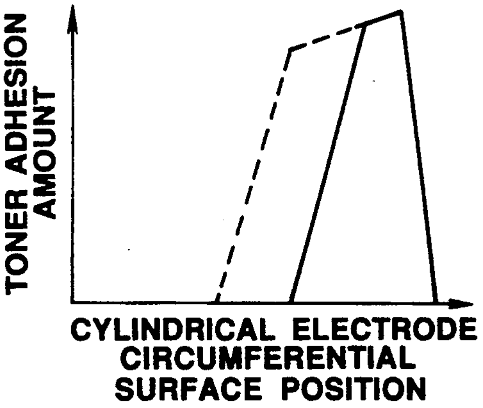

In the second embodiment, however, the leading end of the recording electrode EL is slightly shifted from the closest distance position N to the upstream side of the toner conveying direction $\zeta$. Therefore, since the trailing end portion of the recording electrode EL is separated from the circumferential surface of the cylindrical electrode 5 by a distance larger than that shown in FIG. 11B to weaken the transferring electric field in this portion, it becomes difficult to transfer the toner from the trailing end portion of the recording electrode EL. That is, the trailing end portion of the recording electrode EL falls outside the range capable of forming an electric field which can transfer the toner. As a result, as shown in FIG. 13C, the adhesion region of the toner image is narrowed as compared with that shown in FIG. 13A. When the recovering electric field acts on this toner image, recovery of the toner can be satisfactorily performed because the adhesion amount on the trailing end portion of the toner image to be recovered is smaller than that shown in FIG. 13A. In addition, as shown in FIG. 11A, since the closest distance position Nc on the circumferential surface of the cylindrical electrode 5 is located not immediately above the leading end of the recording electrode EL but on the downstream side thereof, the toner image does not immediately move away from the distal end of the recording electrode EL but moves closer thereto and then moves away therefrom, after passing through a position immediately above the leading end of the recording electrode EL. Therefore, when the transferring electric field is switched to the recovering electric field, the recovering electric field satisfactorily acts on the portion of the toner image above the leading end of the recording electrode EL, thereby improving so-called sharpness of the trailing end of the toner image. That is, the contour of the toner image is clearly formed throughout the edge of the image. As a result, as shown in FIG. 13D, a sharp black dot having better sharpness than that of the black dot shown in FIG. 13B is formed.

When the leading end of the recording electrode is shifted from the closest distance position with respect to the circumferential surface of the cylindrical electrode to the downstream side along the developing agent conveying direction, a speed at which the toner image moves away from the distal end of the recording electrode becomes higher than that in the case shown in FIG. 11B, and the sharpness of the trailing end of the toner image is significantly degraded. As a result, a black dot having a blurred contour is formed.

As shown in FIG. 11A, therefore, the leading end of the recording electrode EL is slightly shifted from the position immediately below the position Nc where the circumferential surface of the cylindrical electrode 5 is closest to the development sleeve 15 to the upstream side along the toner conveying direction $\zeta$. As a result, a high-resolution recording image recording image consisting of sharp black dots excellent in sharpness can be stably formed on the circumferential surface of the cylindrical electrode 5. In this case, it is confirmed by the present inventors that the shift amount of the leading end of the recording electrode EL is preferably 1 mm assuming that the outer diameter of the cylindrical electrode 5 is 20 mm, the outer diameter of the development sleeve 15 is 23 mm, and the thickness of the recording electrode is 23 μm. When the leading end of the recording electrode was shifted by 0.5 mm to the downstream side, an image was blurred significantly, and the image quality could not be recovered even by adjusting other image formation conditions.

As described above, an insulating coat 17*c* is coated on the surface of the recording electrode sheet 17 except for a predetermined small region Z from the leading end serving as the recording electrode EL. Therefore, insulation between the recording electrode lines 17*a* can be assured, and wear of the recording electrode lines 17*a* caused by friction with the magnetic toner d can be prevented. The insulating coat 17*c* is not coated on the leading end portion of the recording electrode sheet 17 for the following reason.

That is, a toner recording image is formed by applying a recording voltage corresponding to recording data to the recording electrode lines 17*a* to form an electric field between the recording electrode lines and the cylindrical electrode 5 and selectively transferring the toner charged by this electric field force to the cylindrical electrode 5, as will be described later. If, however, the insulating coat 17*c* is coated on the surface of the recording electrode lines 17*a* to be applied with the recording voltage, not only a necessary electric field cannot be efficiently formed, but also an unnecessary electric charge is stored in the insulating coat 17*c* to lead to image defects such as scumming or image contamination. Therefore, as shown in FIG. 4, the insulating coat 17*c* is not coated on the leading end of the recording electrode sheet 17 contributing to the formation of a toner recording image and the region Z close to the leading end so that the recording electrode EL is formed by the exposed recording electrode lines 17*a*. As a result, the necessary electric field can be efficiently formed. In addition, since the unnecessary electric charge is not stored, occurrence of image defects such as scumming caused by the unnecessary electric charge can be reliably prevented.

In the manufacture of the recording electrode sheet 17, a base film 17*b* consisting of a flexible insulating material is etched to form a pattern of a large number of recording electrode lines 17*a*, and the insulating coat 17*c* is coated on the resultant sheet except for the leading end region Z.

Figure 14:
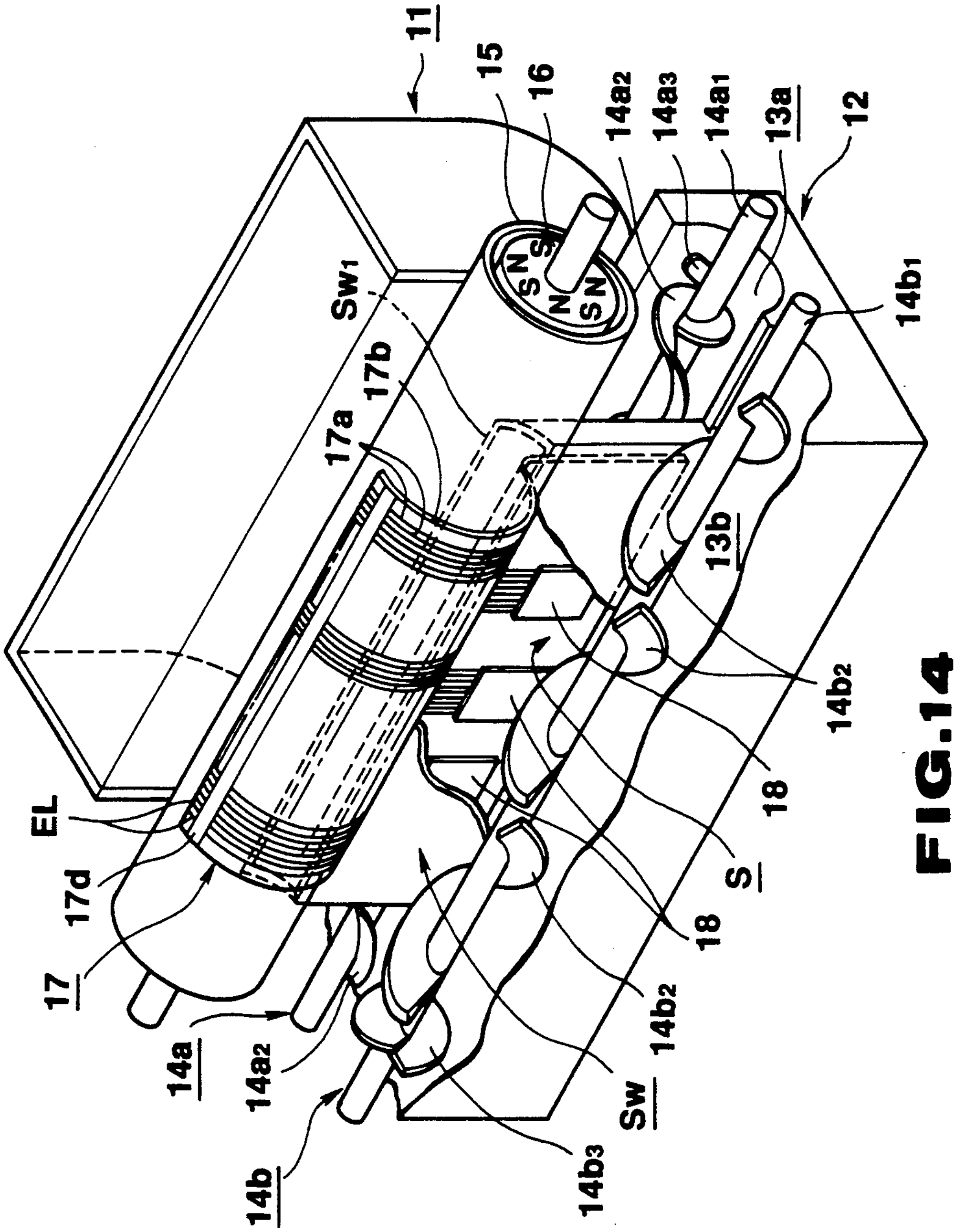
FIG. 14 is a perspective view showing an image forming unit according to the third embodiment of the present invention.

The third embodiment of the present invention will be described below with reference to FIGS. 14 and 15.

Figure 15:
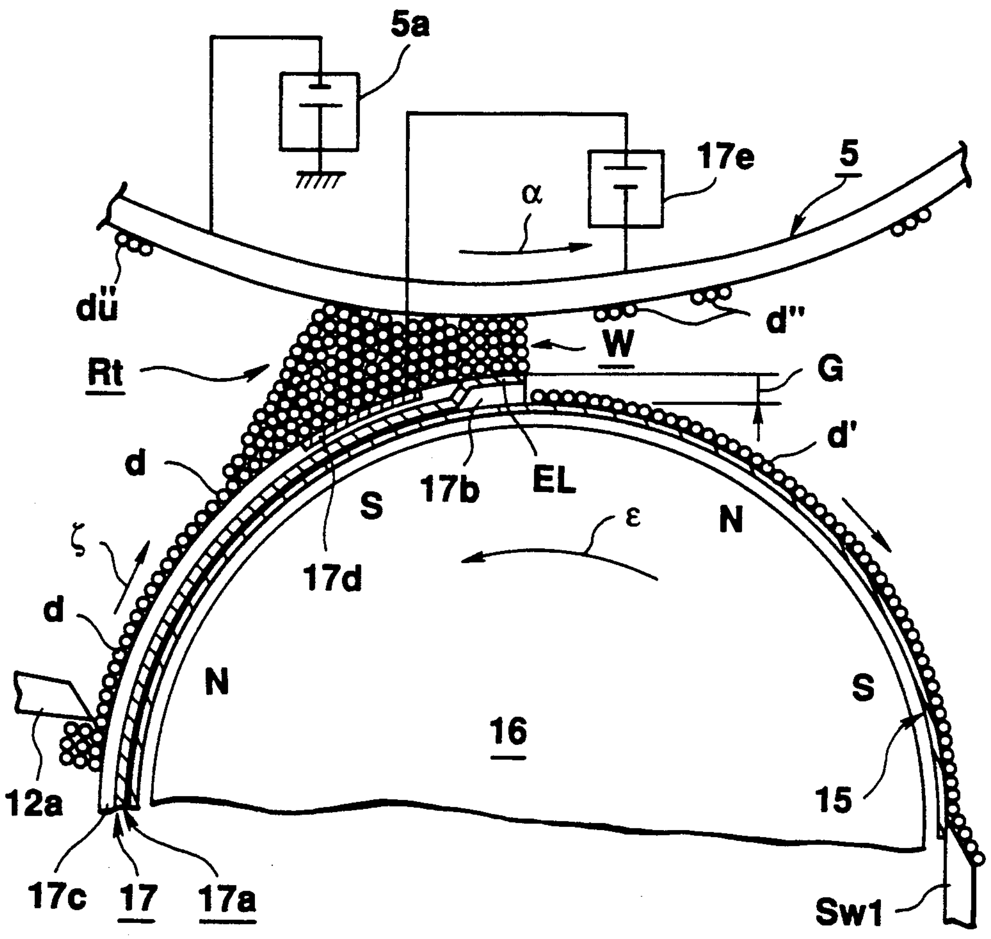
FIG. 15 is a schematic sectional view showing a recording section and its peripheral arrangement of the image forming unit shown in FIG. 15.

FIG. 15 is an enlarged sectional view showing a part of FIG. 2, in which a recording position W and its peripheral portion are illustrated in detail. Referring to FIG. 15, an insulating coat 17*c* is coated on the surface of a recording electrode sheet 17 as in the above embodiments, thereby ensuring electrical insulation between recording electrode lines 17*a* and preventing wear of the recording electrode lines 17*a* caused by friction with magnetic toner d. A leading end portion EL located at the recording position W of the recording electrode lines 17*a* is slightly raised to be exposed on the surface of the insulating coat 17*c*. As in the above embodiments, this exposed leading end portion EL of the recording electrode lines 17*a* serves as a recording electrode portion for essentially performing a recording operation.

A cleaning electrode 17*d* consisting of a non-magnetic conductive material is arranged at a position on the surface of the recording electrode sheet 17 separated by a proper distance from the recording electrode portion EL to the upstream side of a developing agent convey path. The cleaning electrode 17*d* is extended on the surface of the recording electrode sheet 17 throughout in its widthwise direction (see FIG. 14) and buried in the insulating coat 17*c* with its upper surface exposed. The insulating coat 17*c* ensures electrical insulation between the cleaning electrode 17*d* and the recording electrode lines 17*a* buried below it.

A cleaning power source 17*e*, capable of outputting a DC voltage having a polarity opposite to the electrification polarity of a developing agent is arranged between the cleaning electrode 17*d* and a cylindrical electrode 5. In this embodiment, the cleaning power source 17*e*, capable of outputting a voltage of +50 V is installed because the magnetic toner d having a negative electrification polarity is used. The voltage of +50 V is applied from the cylindrical electrode 5 to the cleaning electrode 17*d* to form a cleaning electric field for attracting the negative magnetic toner toward the cleaning electrode 17*d*. By this cleaning electric field, nontransferred toner $d_U''$ remaining on the circumferential surface of the cylindrical electrode 5 is transferred to the cleaning electrode 17*d*, thereby cleaning the surface of the cylindrical electrode 5, as will be described later. Since the cleaning electrode 17*d* as the cleaning means is buried in the recording electrode sheet 17, no exclusive installation space for the cleaning means is required to largely contribute to miniaturization of the electrostatic recording apparatus.

In this embodiment, a step G corresponding to the thickness of the recording electrode sheet 17 is formed on the immediately downstream side of the recording position W. This step G satisfactorily separates magnetic toner d'' transferred to the circumferential surface of the cylindrical electrode 5 to form a recording image from magnetic toner d' remaining on the surface of a development sleeve 15 after image formation, thereby reliably preventing an inconvenience in that the magnetic toners d' and d'' interfere with each other to disturb the formed image.

Referring to FIG. 15, a cleaning electric field is formed on the upstream side of the recording position W in a portion where the cleaning electrode 17*d* faces the circumferential surface of the cylindrical electrode 5 upon application of the voltage of +50 V from the cylindrical electrode 5 to the cleaning electrode 17*d*. By this cleaning electric field, the nontransferred toner $d_U''$ remaining on the circumferential surface of the cylindrical electrode 5 is transferred to the cleaning electrode 17*d*. In addition, in this cleaning electric field formation region, the magnetic toner d conveyed along a toner convey path on the development sleeve 15 (recording electrode sheet 17) side and the nontransferred toner $d_U''$ recovered from the cylindrical electrode 5 temporarily remain to form a toner residue Rt. The nontransferred toner $d_U''$ is removed from the circumferential surface of the cylindrical electrode 5 also by the scraping effect of a toner chain grown in this toner residue Rt. In this manner, since the recording operation is performed again at the recording position W after the nontransferred toner $d_U''$ is removed from the circumferential surface of the cylindrical electrode 5, an image defect such as a residual image caused by poor cleaning does not occur, and a high-resolution recording image is stably formed.

The magnetic toner d' not transferred to the surface of the cylindrical electrode 5 but remaining on the recording electrode sheet 17 moves away from the surface of the cylindrical electrode 5 immediately after passing through the recording position W because the step G is formed on the immediately downstream side of the recording position W. Therefore, an inconvenience in that a toner recording image consisting of the magnetic toner d'' transferred to the surface of the cylindrical electrode 5 at the recording position W is disturbed by mutual interference with the residual magnetic toner d' on the surface of the development sleeve 15 can be reliably avoided.

Note that the present invention is not limited to the above first, second, and third embodiments but can be variously modified within the technical scope of the present invention.

For example, although a toner having negative (−) electrification is used in the embodiment shown in FIG.

2, a toner having positive (+) electrification can be also be used. In this case, a positive (+) polarity is imparted to the bias voltage to be applied to a recording electrode and a cylindrical electrode.

As has been described in detail above, according to the first embodiment, a recording voltage is so controlled as to periodically form a toner recovering electric field each time one black dot is formed over a predetermined period, thereby suppressing the super-position phenomenon to stably form one black dot having an accurate size with a uniform toner adhesion amount. Therefore, since toner can be substantially uniformly deposited with good sharpness to the trailing end of an image even in a continuous dot recording image, a high-resolution dot recording image with good dot reproducibility can be obtained.

According to the second embodiment, a developing agent is conveyed along the surface of the developing agent carrier member by the magnetic field conveying means, a plurality of parallel recording electrodes are arranged on the surface of the developing agent carrier member with a small gap defined with respect to the cylindrical electrode, and the leading end of each recording electrode is located on the upstream side along the developing agent conveying direction from a position opposite to a position on the cylindrical electrode surface closest to the developing agent carrier member. Therefore, a high-resolution recording image consisting of sharp dots each having a clear contour and good sharpness can be stably formed.

According to the third embodiment of the present invention, a developing agent is vertically conveyed upward using a magnetic force from the bottom circulating path and then dropped to be returned to the circulating path. A plurality of parallel recording electrodes are arranged in the vertical convey path, and a cylindrical electrode also serving as an intermediate recording medium is arranged with a small gap therebetween. A cleaning electrode applied with a voltage having a polarity opposite to the charged polarity of the developing agent is arranged on the recording electrode side on the upstream side of a portion where the recording electrodes and the cylindrical electrode oppose each other. Therefore, the small gap in the electrode opposing portion required for formation of a high-resolution image can be accurately and stably assured, and a non-transferred developing agent can be reliably removed from the surface of the cylindrical electrode carrying a toner recording image. As a result, no image defect such as a residual image caused by poor cleaning occurs, and a high-resolution recording image can be stably formed on plain paper.

In addition, since the cleaning electrode is arranged in the developing agent vertical convey path on the cylindrical member and the signal generating means connected to the recording electrodes is arranged in the central space of the bottom circulating path, not only no exclusive installation spaces for the cleaning means and the signal generating means are necessary, but also the recording means packaging a large number of recording electrodes at a high density can be incorporated in the developing agent conveying means. Therefore, the structure of the developing/recording section for simultaneously performing development and recording can be largely simplified. As a result, an electrostatic recording apparatus capable of stably forming a recording image having high resolution on plain paper can be made compact at a low manufacturing cost.

Furthermore, since a developing agent can be uniformly supplied in the widthwise direction of the vertical convey path while being conveyed under agitation along the bottom circulating path, a variation in image density caused by nonuniform supply of the developing agent can be prevented.

Moreover, since the electrostatic recording apparatus of the present invention is of a noncontacting recording type, the recording electrodes do not wear to improve the durability of the recording head. Therefore, the electrostatic recording apparatus capable of stably forming a high-resolution, accurate recording image over a long time period can be provided at low cost by miniaturization by the system of simultaneously performing development and recording.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electrostatic recording apparatus comprising:

developing agent conveying means for conveying a developing agent along a developing agent convey path on a developing agent carrier body;

a plurality of recording electrodes opposing said developing agent conveying means and extending along said developing agent convey path, each of said plurality of recording electrodes having a leading end portion;

an opposite electrode having an opposing portion opposing said plurality of recording electrodes and arranged with a predetermined gap from said plurality of recording electrodes, said opposing portion being movable in a conveying direction of the developing agent; and voltage applying means for applying a recording voltage corresponding to supplied dot recording information to each of said plurality of recording electrodes to generate a transferring electric field for transferring the developing agent to said opposite electrode between said opposite electrode and said plurality of recording electrodes, thereby forming a dot recording image corresponding to the dot recording information on said opposite electrode, wherein each of said leading end portions of said plurality of recording electrodes is arranged at a position shifted from a portion where said developing agent carrier body and said opposite electrode are closest to each other to an upstream side of a developing agent convey direction along said developing agent convey path.

2. An apparatus according to claim 1, further comprising an insulating coat coated on said plurality of recording electrodes except for said leading end portions.

3. An apparatus according to claim 1, wherein said voltage applying means applies, between said plurality of recording electrodes and said opposite electrode, a recovering electric field for recovering a part of the developing agent transferred on said opposite electrode to said plurality of recording electrodes within a one-dot recording period in which one dot of the dot recording information is recorded in the conveying direction of the developing agent.

* * * * *